(12) United States Patent
J et al.

(10) Patent No.: US 12,210,937 B2
(45) Date of Patent: Jan. 28, 2025

(54) APPLYING SCORING SYSTEMS USING AN AUTO-MACHINE LEARNING CLASSIFICATION APPROACH

(71) Applicant: SAP SE, Walldorf (DE)

(72) Inventors: Karthik S J, San Mateo, CA (US); Amy He, Redwood City, CA (US); Prajesh K, Mattanur (IN); Georg Glantschnig, Los Altos, CA (US); Riya Thosar, Fremont, CA (US); Arjun Karat, Santa Clara, CA (US); Yann Le Biannic, Suresnes (FR); Jing Ye, Palo Alto, CA (US); Subhobrata Dey, Mountain View, CA (US); Prerna Makanawala, Mountain View, CA (US); Xiaoqing He, Palo Alto, CA (US)

(73) Assignee: SAP SE, Walldorf (DE)

( * ) Notice: Subject to any disclaimer, the term of this patent is extended or adjusted under 35 U.S.C. 154(b) by 1358 days.

(21) Appl. No.: 16/194,157

(22) Filed: Nov. 16, 2018

(65) Prior Publication Data
US 2020/0159690 A1    May 21, 2020

(51) Int. Cl.
*G06N 20/00* (2019.01)
*G06F 9/445* (2018.01)
*G06F 16/215* (2019.01)
*G06N 20/20* (2019.01)

(52) U.S. Cl.
CPC ......... *G06N 20/00* (2019.01); *G06F 9/44505* (2013.01); *G06F 16/215* (2019.01); *G06N 20/20* (2019.01)

(58) Field of Classification Search
CPC .... G06N 20/00; G06N 20/20; G06F 9/44505; G06F 16/215
See application file for complete search history.

(56) References Cited

U.S. PATENT DOCUMENTS

| 8,606,838 B1 * | 12/2013 | Kenefic | G06F 17/17 |
| | | | 708/313 |
| 2002/0078009 A1 * | 6/2002 | Hume | G06F 16/93 |
| 2009/0307602 A1 * | 12/2009 | Brewer | G06Q 10/10 |
| | | | 715/744 |

(Continued)

*Primary Examiner* — Tan H Tran
(74) *Attorney, Agent, or Firm* — SCHWEGMAN LUNDBERG & WOESSNER, P.A.

(57) ABSTRACT

A method of improving usability and transparency of machine-learning aspects of applications providing various types of services is disclosed. Based on a request submitted through an administrative user interface, a data readiness check is performed on underlying data associated with the application. Based on a successful completion of the data readiness check, a configuration file is retrieved from an application server. The configuration file specifies a plurality of keys for generating a machine-learned model for the application. The machine-learned model is trained based on the plurality of keys specified in the configuration file. The machine-learned model is selected from a plurality of machine-learned models based on dry runs of the each of the plurality of models. The machine-learned model is activated with respect to the application. Scores are identified from the underlying data items based on the selected machine-learned model.

24 Claims, 20 Drawing Sheets

(56) References Cited

U.S. PATENT DOCUMENTS

| | | | | |
|---|---|---|---|---|
| 2012/0158623 | A1* | 6/2012 | Bilenko | G06N 20/00 |
| | | | | 706/12 |
| 2014/0025354 | A1* | 1/2014 | Padullaparthi | G06Q 10/00 |
| | | | | 703/2 |
| 2014/0379619 | A1* | 12/2014 | Permeh | G06F 9/5038 |
| | | | | 706/12 |
| 2016/0055589 | A1* | 2/2016 | Billings | G06Q 40/08 |
| | | | | 705/4 |
| 2016/0162779 | A1* | 6/2016 | Marcus | G06N 20/10 |
| | | | | 706/12 |
| 2017/0300635 | A1* | 10/2017 | Ganesan | G16H 15/00 |
| 2018/0330280 | A1* | 11/2018 | Erenrich | G06N 20/00 |
| 2018/0341898 | A1* | 11/2018 | Bose | G06Q 30/0202 |
| 2018/0374098 | A1* | 12/2018 | Zhang | G06F 18/214 |

* cited by examiner

MACHINE LEARNING SCENARIOS: ALL (4)

| NAME | BUSINESS OBJECT | AREA | TYPE | CREATED BY | CREATED ON |
|---|---|---|---|---|---|
| ACCOUNT INTELLIGENCE | ACCOUNT | SALES | SCORING | HUI LI | 07.12.2017 22:06 UTC |
| LEAD SCORING | LEAD | SALES | SCORING | DHAL BHAGYA | 07.09.2014 17:02 UTC |
| OPPORTUNITY SCORING | OPPORTUNITY | SALES | SCORING | PRAJESH K | 06.05.2017 18:30 UTC |

ADD MODEL  TRAIN  GET STATUS  ACTIVATE  SETTINGS

MODELS (8)

| NAME | STATUS | DATA SOURCE |
|---|---|---|
| ACCNTHL_20171213_1132AM | ACTIVE | AUTO EXTRACTION |
| ACCNTHL_20180111_0238PM | ACTIVE | AUTO EXTRACTION |
| KARUNYA C2 TEST | ACTIVE | AUTO EXTRACTION |

*FIG. 3*

READINESS REPORT: LEAD SCORING

☑ CONGRATULATIONS! YOU MEET ALL THE READINESS CRITERIA TO ACTIVATE THE MODEL.
LAST GENERATED: 28.03.2018

THE MACHINE LEARNING (ML) READINESS REPORT ASSESS YOUR ORGANIZATION'S READINESS TO DEPLOY SAP HYBRIA SALES & SERVICE CLOUDS OUT OF THE BOX ML CAPABILITIES BY LOOKING AT THE DATA IN YOUR TENANT. BASED ON THE REPORT, YOU CAN DECIDE TO EITHER DEPLOY MACHINE LEARNING FEATURES OR TAKE CORRECTIVE ACTIONS TO IMPROVE DATA READINESS BEFORE DEPLOYING.

| RESULT | READINESS CHECK FACTOR | ACTUAL VALUE | MINIMUM VALUE | RECOMMENDED VALUE | DESCRIPTION |
|---|---|---|---|---|---|
| ☑ | DATA VOLUME OVERALL | 1,045 | 100 | 1,000 | IT IS THE TOTAL NUMBER OF RECORDS AVAI... |
| ☑ | CONVERSION RATE | 97 | 60 | 100 | INDICATES THE PERCENTAGE OF LEADS THA... |
| ☑ | DATA VOLUME (LAST 12 MONTHS) | 188 | 100 | 150 | INCLUDES THE TOTAL NUMBER OF RECORDS... |

FIG. 4

☰ ⓘ CLOUD FOR CUSTOMER     OPPORTUNITIES     🔍 ⓘ④ 👤 KATE JACOB ˅

MY TEAMS OPPORTUNITIES (109) ⌄     🔍 ⚙ ↕ ▽

| NAME | ACCOUNT | SCOR. | CLOSE DAT. | SALES PHASE | OWNER | STATUS |
|---|---|---|---|---|---|---|
| ⓘ Q1 OPTY BLUE... | BLUEDRIVE | 82 | 25.01.2018 | DECISION | MIKE SUMM... | IN PROC... |
| ⓘ BLUECHIP OPPY | BLUECHIP SYS... | 77 | 06.12.2017 | QUALITY OPP... | KATE JACOB | IN PROC... |
| ⓘ NEW OPPT FRO... | GREEN MILE | 77 | 15.11.2017 | IDENTIFY OPP... | DIANE WILLI... | IN PROC... |
| ⓘ CONTRACT FOR... | ALPHA CORPO... | 72 | 25.12.2017 | QUALITY OPP... | KATE JACOB | IN PROC... |
| ⓘ INTEREST IN 25... | OMEGA SYSTE... | 70 | 15.11.2017 | QUALITY OPP... | MIKE SUMM... | STOPPE... |
| ⓘ NEW OPPORTU... | THE FLYING BE... | 67 | 08.11.2017 | QUALITY OPP... | DIANE WILLI... | IN PROC... |
| ⓘ PROPOSAL FOR... | INDIBLU | 60 | 25.10.2017 | IDENTIFY OPP... | MIKE SUMM... | IN PROC... |
| ⓘ BLUECHIP SYS... | BLUECHIP SYS... | 49 | 05.11.2017 | QUOTATION | PHIL HUGH... | WON |
| ⓘ OPPORTUNITY... | KIXO | 48 | 31.10.2017 | IDENTIFY OPP... | MIKE SUMM... | IN PROC... |
| ⓘ Q2 OPPORTUN... | CALA FOODS | 45 | 15.11.2017 | DEVELOP VAL... | MIKE SUMM... | IN PROC... |
| ⓘ THE MONDAY 1... | TOP BLAB | 44 | 11.11.2017 | DECISION | PHIL HUGH... | IN PROC... |
| ⓘ LARGE Q4 DEA... | GREEN MILE | 40 | 07.05.2018 | IDENTIFY OPP... | MIKE SUMM... | IN PROC... |
| ⓘ ACRON - NEW B... | GREEN MILE | 39 | 06.11.2017 | IDENTIFY OPP... | BOB MENS... | IN PROC... |
| ⓘ PRODUCT P300... | ALPHA CENTER | 32 | 25.04.2018 | IDENTIFY OPP... | BOB MENS... | IN PROC... |
| ⓘ MKT OPPT2 | NETCOM BUSI... | 31 | 03.11.2017 | QUOTATION | MIKE SUMM... | IN PROC... |
| ⓘ RUSTIC Q3 BID | RUSTIC CONST... | 30 | 24.10.2017 | IDENTIFY OPP... | PHIL HUGH... | IN PROC... |
| ⓘ SECOND ALPHA... | ALPHA CORPO... | 28 | 15.02.2018 | IDENTIFY OPP... | MIKE SUMM... | OPEN |

|< < [1] /8 > >|

---

ⓘ Q1 OPTY BLUE DRIVE

82 OPPORTUNITY SCORE
VERY LIKELY TO CLOSE

KEY FACTORS
↑ CLOSE DATE IS IN Q4
↑ SALES OWNER WIN RATE IS 60%
↓ DAYS IN CURRENT PHASE IS 4
↓ DAYS SINCE LAST UPDATE IS 15

ACTIVITY ENGAGEMENT
✉1 ☎1 📧0 📂2

RECEIVED    0
SENT    1
LAST ACTIVITY    17.08.2017

82 DAYS TO CLOSE

1 TIME CLOSING DATE PUSHED

11 DAYS IN IDENTIFY OPPORTUNITY STATUS

↘ AMOUNT CHANGED
$0.00 → $32K
LAST UPDATED: 10.24.17

↘ STATUS UNCHANGED

1 TIME DEAL SLIPPED

| ⊿ | A | B | C |
|---|---|---|---|
| 1 | SUBJECT | DESCRIPTION | CATEGORY |
| 2 | TEST | FLYING IN THE STATES USED TO BE A PLE... | COMPLAINT |
| 3 | TEST | ARE BOX ALLOWED AS CHECKED IN LUGGA.. | REQUEST |
| 4 | TEST | HELLO, I WAS UNABLE TO ADD MY SKYMILE.. | REQUEST |
| 5 | TEST | HEY CAN I TRANSFER MY POINTS EARNED... | REQUEST |
| 6 | TEST | WILL BE MISSING FLIGHT 3463 TO COLUMB... | REQUEST |
| 7 | TEST | FLIGHT TO LUBBOCK CANCELLED DUE TO.... | REQUEST |
| 8 | TEST | JUST BOOKED SOME FLIGHTS VIA BUT I CA.. | REQUEST |
| 9 | TEST | JUST HAD AN EXCELLENT DISPLAY OF CUS... | COMPLIMENT |

FIG. 17

APPLYING SCORING SYSTEMS USING AN AUTO-MACHINE LEARNING CLASSIFICATION APPROACH

TECHNICAL FIELD

The present disclosure generally relates to machine-learning and, in one specific example, to applying scoring systems using an automatic machine-learning classification approach.

BACKGROUND

Machine learning can be used to analyze past data, discover patterns, and create statistical models to make predictions about the future. In some cases, machine-learning predictive setups may be implemented in a cloud environment, such as SAP Cloud for Customer (C4C), to, for example, manage customer sales, customer service, and marketing activities more efficiently.

Machine-learning is only as good as the data on which it is based. This is known as the "garbage in, garbage out" principle. The problem is as old as data-processing itself. Taking shortcuts in assembling large, well-labeled datasets to train machine-learning systems may be costly, but necessary given various constraints (e.g., limited time, resources, and so on) that are typically applied to this kind of work.

BRIEF DESCRIPTION OF THE DRAWINGS

FIG. 3 is a screenshot of an example user interface for managing machine-learning scenarios for installed and configured system objects.

FIG. 4 is a screenshot of an example user interface in which a data readiness report is presented.

FIG. 13 is a screenshot of a user interface for machine-learning for opportunity objects.

FIG. 15 is a screenshot of a user interface for machine-learning for account objects.

FIG. 16 is a screenshot of a user interface for machine-learning for ticketing objects.

FIG. 17 is a listing of an example training data set for a model for service ticketing objects.

DETAILED DESCRIPTION

In the following description, for purposes of explanation, numerous specific details are set forth in order to provide an understanding of example embodiments of the present subject matter. It will be evident, however, to those skilled in the art that example embodiments may be practiced without these specific details.

A method of improving usability and transparency of machine-learning aspects of applications providing various types of services, such as lead or opportunity scoring, is disclosed. Based on a request submitted through an administrative user interface, a data readiness check is performed on underlying data associated with the application. Based on a successful completion of the data readiness check, a configuration file is retrieved from an application server. The configuration file specifies a plurality of keys for generating a machine-learned model for the application. The machine-learned model is trained based on the plurality of keys specified in the configuration file. The machine-learned model is selected from a plurality of machine-learned models based on dry runs of the each of the plurality of models. The machine-learned model is activated with respect to the application. Scores are identified from the underlying data and presented in an interactive user interface corresponding to the application.

This method and example embodiments disclosed herein may be implemented by a specially-configured computer system. The computer system may be specially configured by one or more non-standard modules (e.g., hardware modules or software modules implementing operations described herein, which include non-routine and unconventional operations and/or a non-routine or unconventional combination of operations) and implemented by one or more computer processors of the computer system. This method and example embodiments disclosed herein may be embodied as instructions, as described herein, stored on a machine-readable medium that, when executed by one or more processors of a computer system, cause the computer system to perform one or more operations described herein, which include non-routine and unconventional operations and/or a non-routine or unconventional combination of operations.

The details of one or more variations of the subject matter described herein are set forth in the accompanying drawings and the description below. Other features and advantages of the subject matter described herein will be apparent from the description and drawings, and from the claims.

Figure 1:
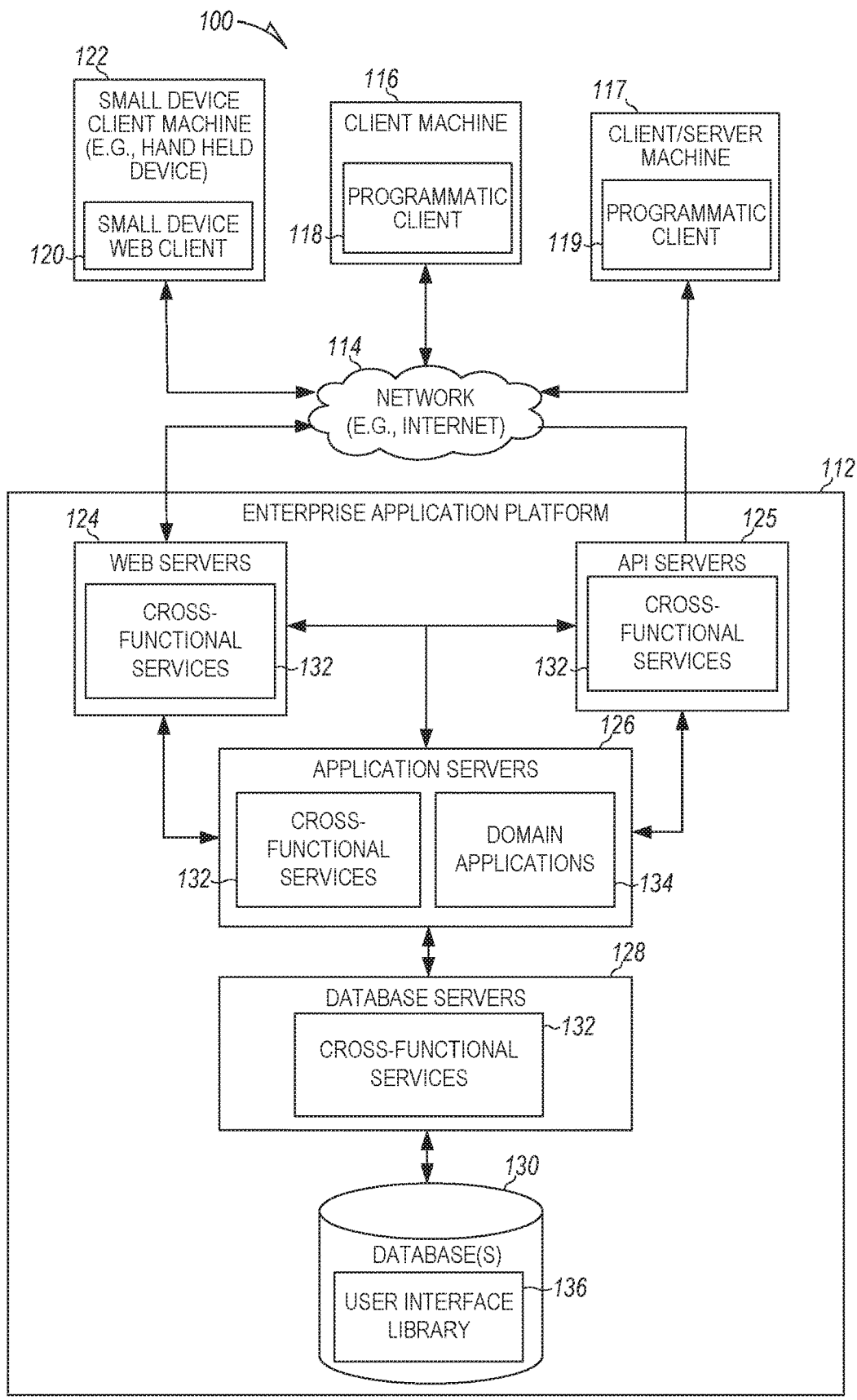
FIG. 1 is a network diagram illustrating a client-server system, in accordance with some example embodiments.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-7.

Figure 2:
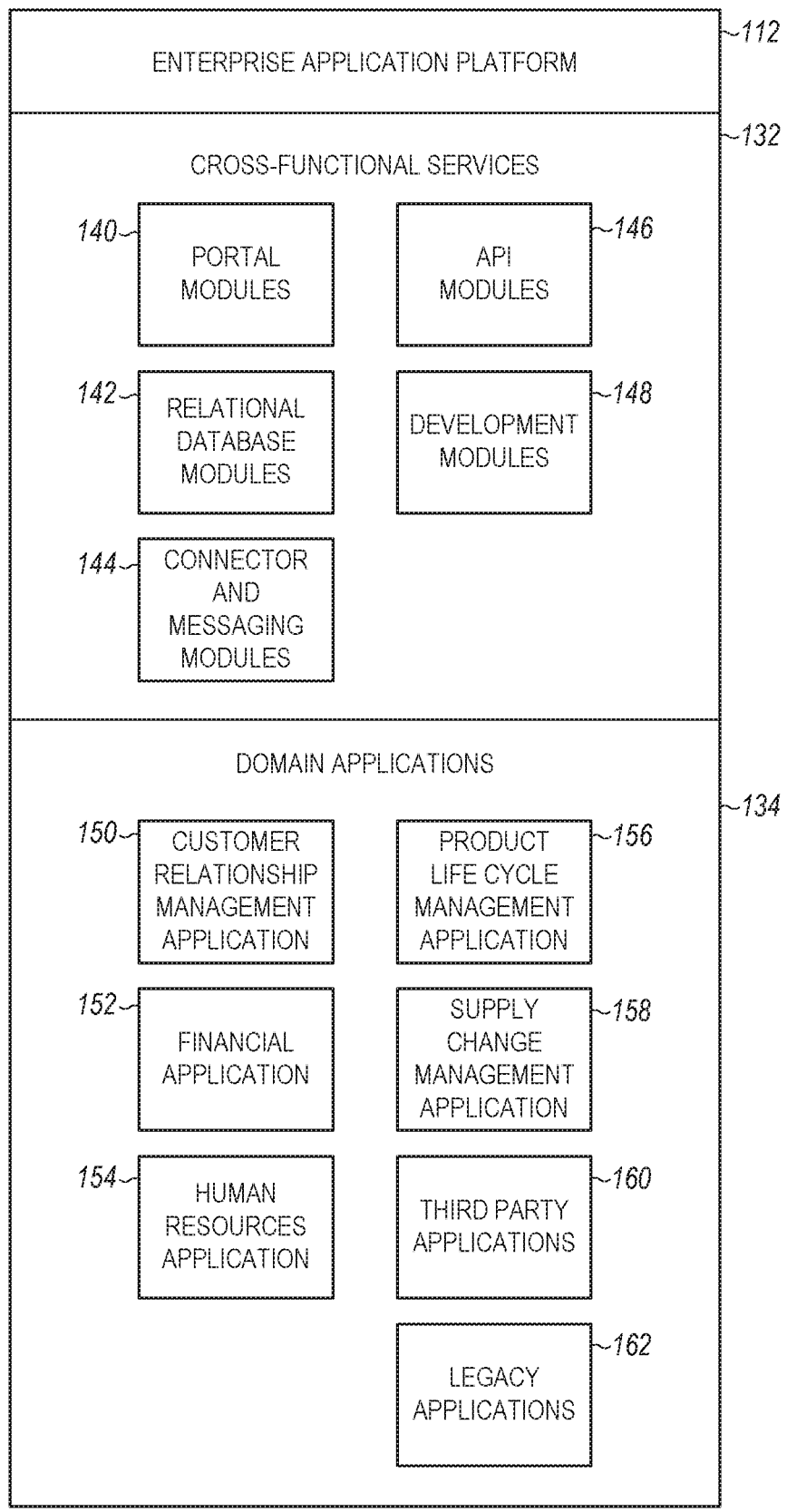
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Examples of machine-learning predictive setups (e.g., in a cloud environment) may include deal intelligence, tickets categorization, lead scoring, and account intelligence.

Deal Intelligence analyzes the data sets from the solution and creates a predictive model that is automatically generated to be tailored to your team's data profile. The predictive model is applied to provide the end users with instant opportunity scoring for actionable insight. Therefore, sales managers can focus on opportunities with highest propensity of closing and de-prioritize ones with high risk using opportunity scoring. With sophisticated machine learning scoring algorithms, opportunity scoring helps you track the probability of an opportunity closing through an activity score, activity summary, and key risks.

Ticket Intelligence categorizes your tickets, routes it to the right agent, and improves the accuracy and the time taken to close tickets. By applying deep learning techniques to the content of incoming support tickets, they can be efficiently routed and categorized to the right service-level category. For example, when a new service ticket comes via email, social channels, and other sources in the solution, the ticket data is used to prepare, train, and store the model to the prediction services. Ticket intelligence predicts the category and suggests answers to the service agent. Meanwhile, the model constantly captures feedback to be retrained for improved accuracy over time.

Lead intelligence uses the machine learning model trained on past data to predict the probability of a lead getting converted into an opportunity. Lead intelligence is a ranking technique. Higher the score means higher the chance of getting the lead converted into an opportunity. Lead intelligence prioritizes leads based on the propensity to be converted into an opportunity. It helps sales and marketing teams predict and prioritize leads that are likely to get converted into successful opportunities compared to opportunities that are unlikely to get converted.

Account intelligence helps improve the conversion rates and focus on top of the funnel prioritization using the account intelligence scoring. In the side pane, you can view buying intent score, pipeline information, win rate, total sales value for the account, activity engagement, and also new articles related to the account.

In example embodiments, each of these machine-learning predictive setups may be represented as objects that may be installed and configured via a user interface of an administration system. In example embodiments, before creation of a machine-learning model for any one of these objects, a check of the readiness of the associated data may be completed. The readiness check may check whether the underlying data is of sufficient quality and/or in a useful scale, format, and volume. In example embodiments, a readiness report may be generated and presented within the administrative user interface. The readiness report may present the assessed readiness of the data based on concrete factors, including total data volume, data volume with change history, and so on.

The quality requirements of the data set for training a machine-learning model for any of these types of machine-learning predictive setups may be based on corresponding parameters (e.g., readiness check factors), such as parameters pertaining to a number of historical records that are required (e.g., 5 K records) and/or a time period over which the records are collected (e.g., 12 months), and so on. In example embodiments, when the quality of the data does not meet the necessary requirements (e.g., as defined by the parameters), the administrator may be prevented from creating the model. In example embodiments, the readiness report may indicate a minimum value for each parameter as well as its current value such that reasons for any failure of the readiness check are readily apparent to an administrator and/or so that corrective action may be taken to better prepare the data.

FIG. 3 is a screenshot of an example user interface 300 for managing machine-learning scenarios for installed and configured system objects. As depicted, machine-learning models have been added for account, lead, and opportunity objects. The user interface includes user interface elements for adding an additional machine-learning model (e.g., the "Add Model" user interface element), train an existing model (e.g., the "Train" user interface element), get status of an existing model (e.g., the "Get Status" user interface element), and view settings corresponding to an existing model (e.g., the "Settings" user interface element).

In example embodiments, invocation of the Settings user interface element results in a display of queries configured and currently selected for the model, including pre-delivered, administrator-created, and custom queries). It may also provide a user interface for creating a custom query, including specifying one or more required search parameters. The custom query may then be saved and made accessible (e.g., through a drop-down user interface element) for associating with a model.

In example embodiments, particular user interface elements may be disabled (or grayed-out) based on various factors, such as whether the data readiness check for the model has been completed. Thus, for example, as depicted, the "Train" user interface element has been disabled for the currently-selected Account object (e.g., based on the data-readiness check not having been performed or not having been completed successfully).

The Get Status user interface element may cause the status of the selected training model(s) to be presented (e.g., in conjunction with the current screen or in another screen). Different statuses that a model goes through may include, for example, Created, Training in Progress, Training Failed, Training Completed, and Active.

Triggering of the Train user interface element causes training of a machine-learning model based on the underlying data. The training is performed in accordance with configuration and activation data provided by one or more service applications 126.

In example embodiments, the Activate user interface element may be activated after training is completed. The model becomes activated upon triggering of the Activation user interface element, causing all future scoring related to the selected object to be done using the activated model. In example embodiments, there can only be one active model for each object.

FIG. 4 is a screenshot of an example user interface 400 in which a data readiness report is presented. Here, the data readiness report corresponds to, for example, a lead business object that may be presented in FIG. 3 in response to the administrator invoking an "Add Model" user interface element (e.g., button, hyperlink, and so on) and subsequently identifying (e.g., on an additional screen of the user interface) the Lead object as the object for which a model was to be created. The data readiness report indicates whether the data underlying the identified object satisfies previously-defined data readiness criteria. For example, the example data readiness criteria for the lead object includes a minimum overall data volume (e.g., 100 records), a minimum conversion rate (e.g., a 60% conversion rate of sales leads to sales), and a minimum data volume over the last 12 months (e.g., 100 records). The report may indicate the actual values in the underlying data corresponding to each of the readiness check factors, such as the overall data volume (e.g., 1045 records), the conversation rate (e.g., 97 percent), and the data volume for the last 12 months (e.g., 188 records). Additionally, the readiness report may indicate that last time the readiness report was generated and whether the underlying data has satisfied the readiness criteria. Although not shown, the readiness report may also highlight any criteria that were not satisfied.

Figure 5:
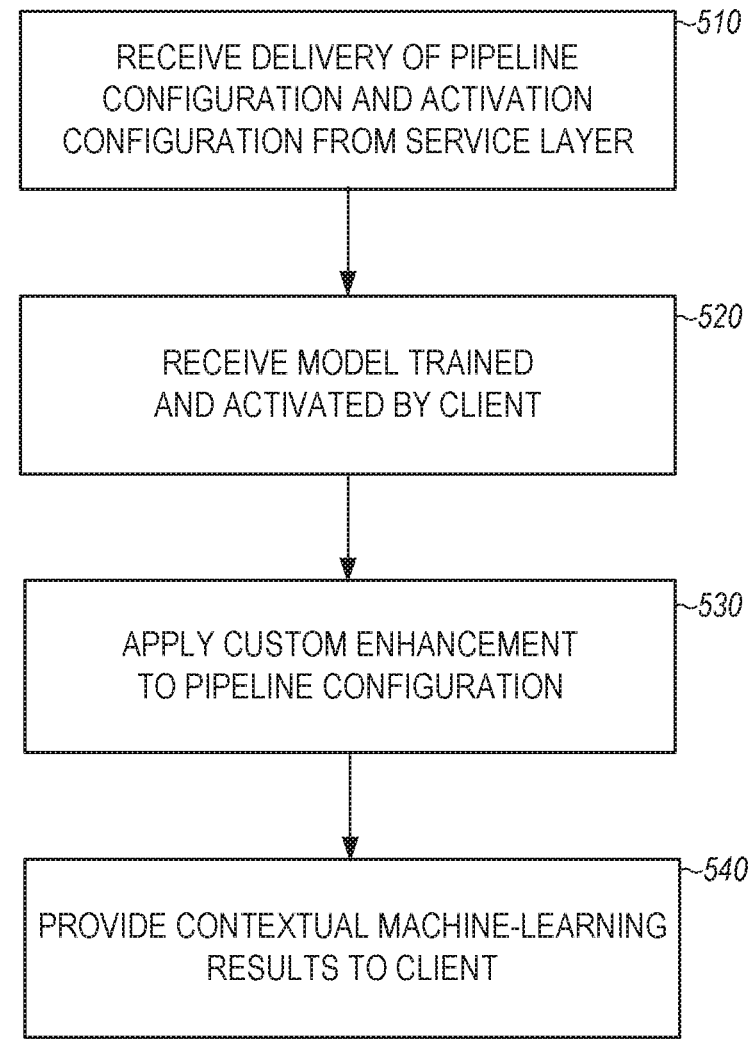
FIG. 5. Is a flowchart of example operations of improved machine-learning model generation and application

FIG. 5. Is a flowchart of example operations 500 of improved machine-learning model generation and application of the model. At operation 510, delivery of pipeline configuration and/or activation configuration content is received from the applications servers 126. An example of the configuration content may include a feature engineering configuration file (e.g., see FIG. 8). This configuration content may thus specify one or more sampling methods (e.g., see FIGS. 7 and 8) and a target for a population key and one or more feature templates (e.g., core, history table, activity features, product features, or third-party features). The feature configuration file may be selected based on a matching of aspects of the feature configuration file to a selected data object type (e.g., an account object, a lead object, an opportunity object, or a ticketing object).

At operation 520, a machine-learned model trained and activated by a client device is received. In example embodiments, one or more APIs of one or more back-end services are called (e.g., with the feature engineering configuration file as input). In example embodiments, the back-end services then collect the underlying data from the various sources specified in the engineering configuration file and apply the specified sampling methods with respect to the specified target. In example embodiments, the back-end services are called for multiple engineering configuration files and the back-end services then select an optimal configuration file based on dry runs of machine-learned models corresponding to each of the configuration files received.

At operation 530, one or more custom enhancements are applied to the pipeline configuration. In example embodiments, the possible sampling methods and features may be presented in a user interface for selection (e.g., by an administrator) to add or reduce sampling methods, features, or data sources that are specified in the configuration template for the machine-learned model. In example embodiments, results of the dry runs are surfaced in the user interface to provide information relevant to the selection of sampling methods, targets, and feature sets for the configuration template. Thus, a feedback loop may be utilized to improve the configuration file selection for a particular data object.

At operation 540, contextual machine-learning results are provided to the client for presentation in one or more user interfaces (see, e.g., FIGS. 12-17). These data may include derivations of key features and their strengths as determined through application of the machine-learning model to the customer's historical data.

Figure 6:
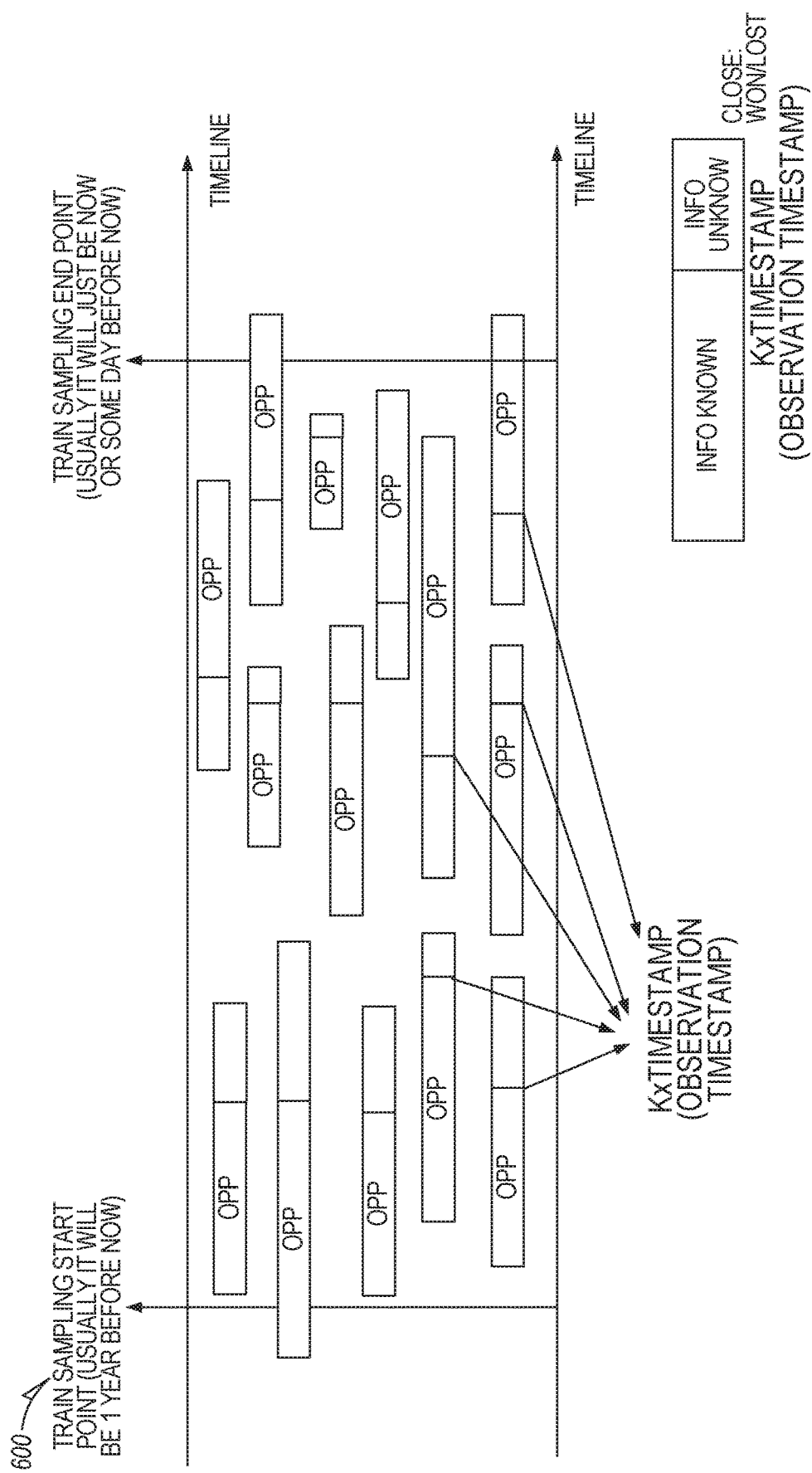
FIG. 6 is a depiction of a sampling method that includes randomly selecting one sample point from one object.

FIG. 6 is a depiction of a sampling method 600 that includes randomly selecting one sample point from each object. In example embodiments, the sampling start point is a predetermined period before the current date and time (e.g., 1 year before now). Each sample point includes known information portion and unknown information at a particular, randomly-selected observation timestamp (e.g., K×TimeStamp). A prediction as to success or failure (e.g., whether a deal or opportunity closed or not and/or whether the deal or opportunity closed within a particular time period, such as a financial period or quarter end) is then made at the randomly-selected time point using the machine-learned model, which is then checked against the reality of whether there actually was success or failure based on the underlying historical data included in each object.

Figure 7:
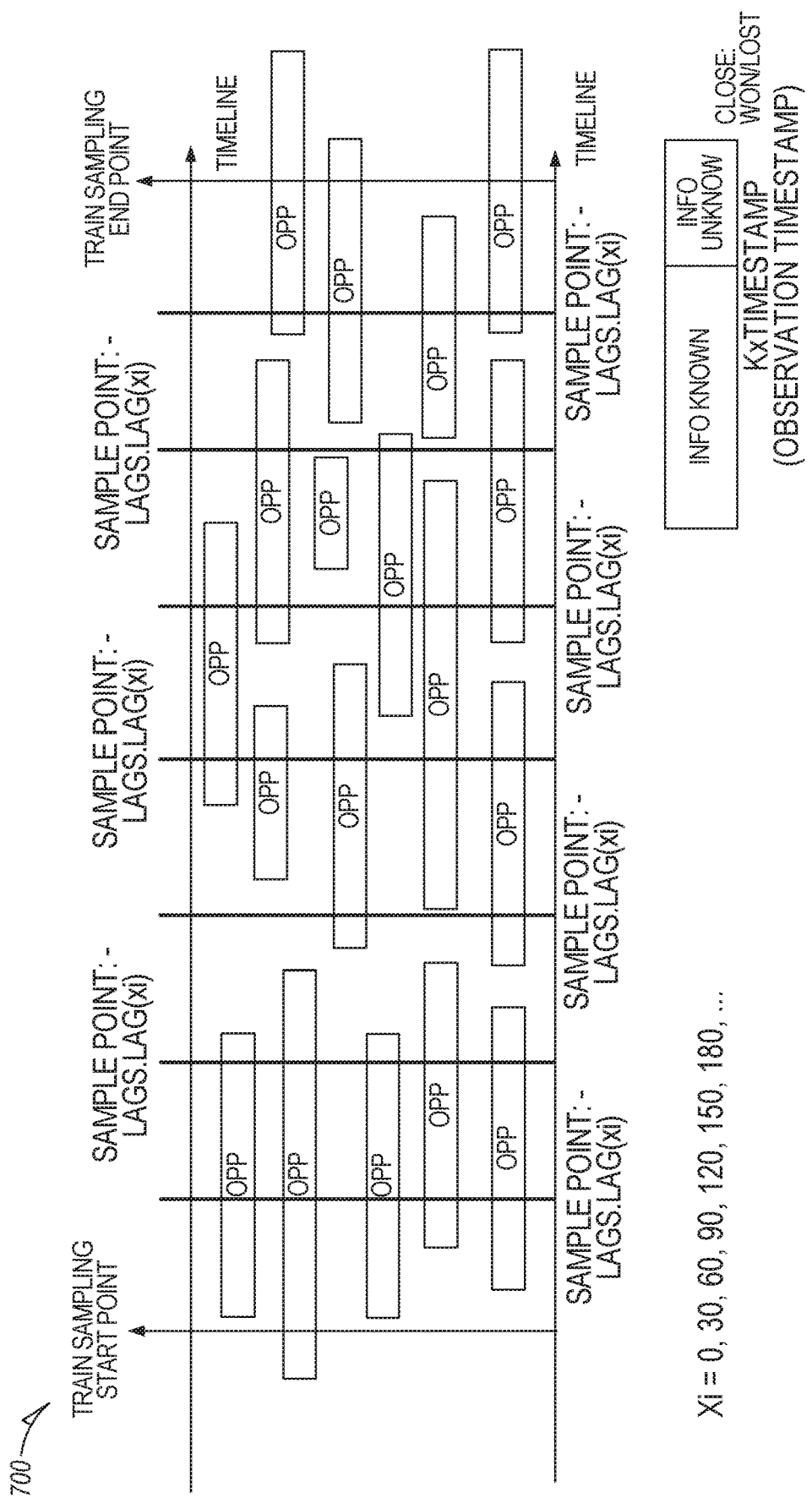
FIG. 7 is a depiction of a sampling method that includes selecting multiple sample points from one object and cutting by a fixed time point.

FIG. 7 is a depiction of a sampling method 700 that includes selecting multiple sample points from one object and cutting by a fixed time point (e.g., LAGS.LAG(xi). In example embodiments, the train sampling starting point and train sampling end point are selected over a time period (e.g., 1 year before now to now), as discussed with respect to FIG. 6. Sample points are selected by cutting through the sampling objects (e.g., which represent opportunities, leads, or other objects for which a success or failure can be determined) at predetermined time points (e.g., 0, 30, 60, 90, 120, 150, and 180 days). For each object, the time before the cutoff is treated as unknown information and the time after the cutoff is treated as known information for training purposes. As with the sampling method of FIG. 6, the machine-learned model is applied to the known information portion of each object and a prediction is made as to ultimate success or failure of the object, such as whether the deal closed or whether the deal closed within a particular time frame. This prediction is then checked against the reality of the success or failure according to the underlying historical data included in each object.

Figure 8:
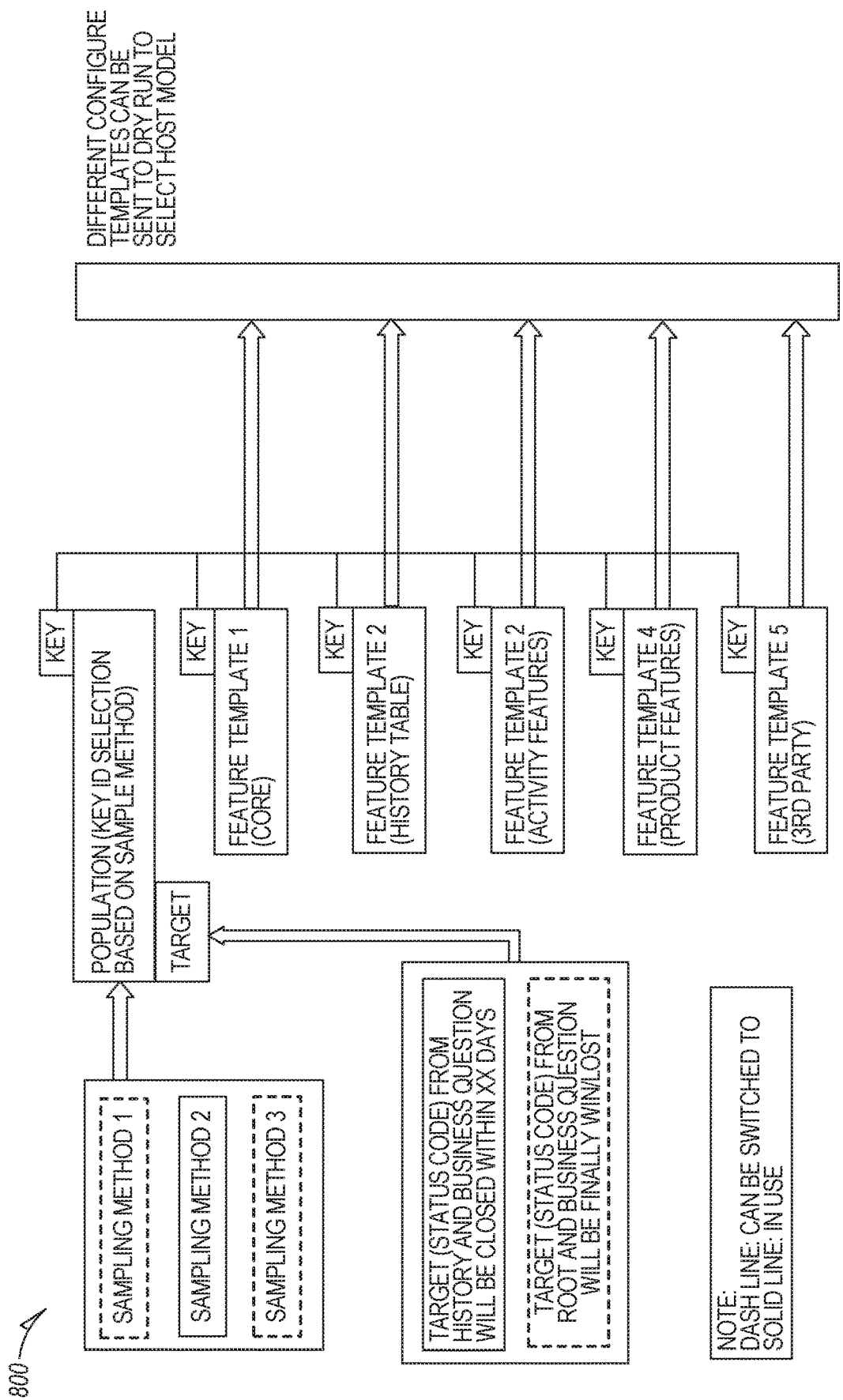
FIG. 8 is a depiction of a feature engineering configuration.

FIG. 8 is a depiction of a feature engineering configuration 800 upon which the training of the machine-learning model is based. As depicted, the feature engineering configuration includes a plurality of keys. A population key may take a selected sampling method (e.g., sampling method 600 or sampling method 700) and a selected target value (e.g., success or failure or success or failure within a predetermined number of days) that is to be applied across the underlying historical data over a particular time period. Additional keys may include feature templates associated with core data (e.g., client communications, state of underlying data objects), history table, activity features, product features, and third-party data upon which the training model is based. Different combinations of sampling methods and targets can be applied across the data and various combinations of keys may be used to generate a plurality of machine-learned models. The models may then be tested in dry runs to determine the best model.

Figure 9:
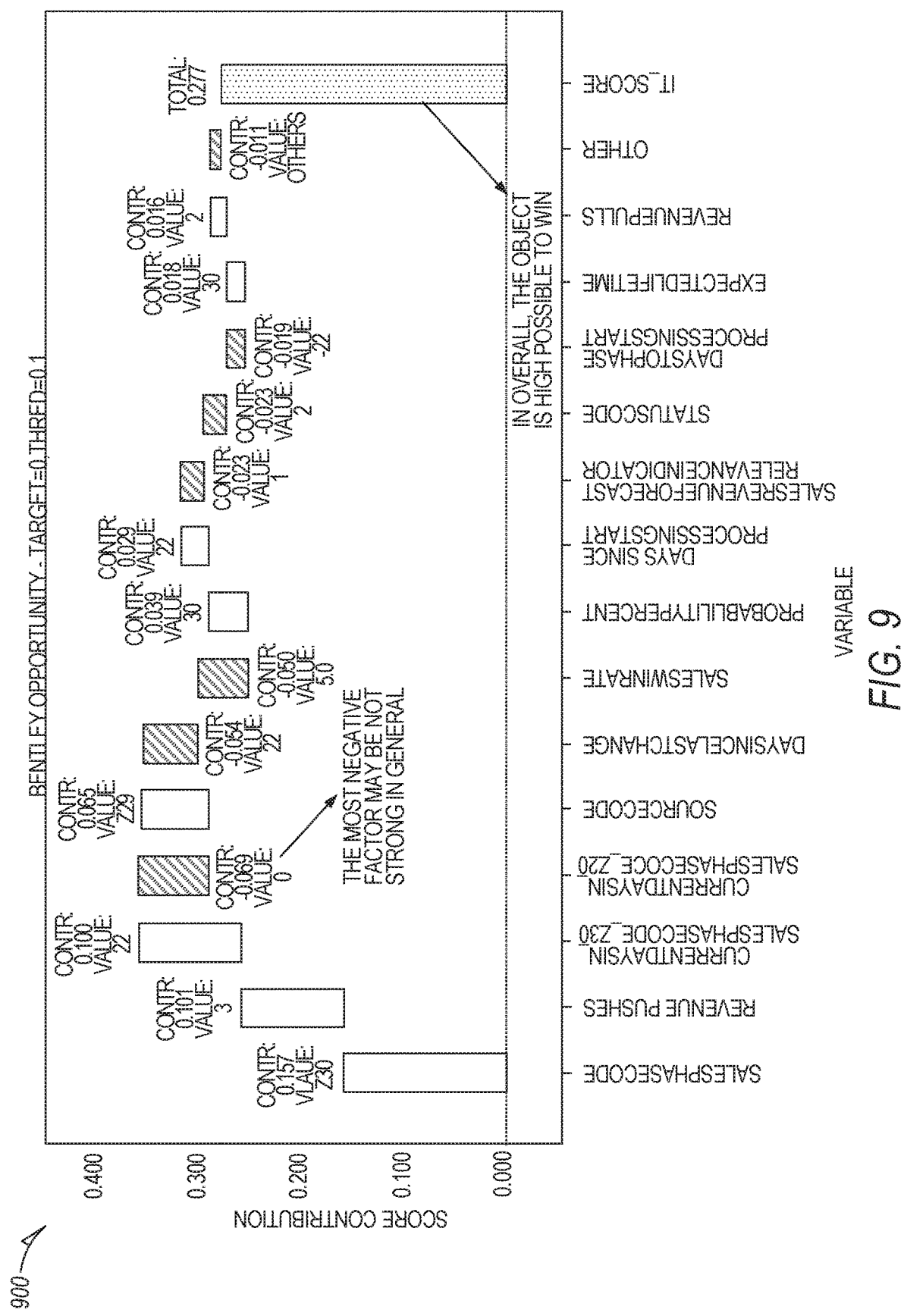
FIG. 9 is a depiction of an example reason code strength explanation.

FIG. 9 is a depiction of an example reason code strength explanation 900. The reason code indicates key factors (reasons) in a target prediction. The reason code also specifies how strong of an impact each of the key factors has on the target prediction. Here, the target prediction relates to an opportunity being won or lost. The key factors identified in the prediction are sales phase code, revenue pushes, current days in for a first sales code, current days in for a second sales code, source code, days since last change, sales win rate, days since processing start, sales revenue forecast relevance indicator, status code, days to phase processing start, expected outcome revenue pulls, and other. Based on the indications of the positive and negative strengths of each of the factors, it is possible to see that the most negative factor (current days in for a first sales code) is not particularly strong relative to the other factors. Here, the sum of the factors shows a high probability of success.

Figure 10:
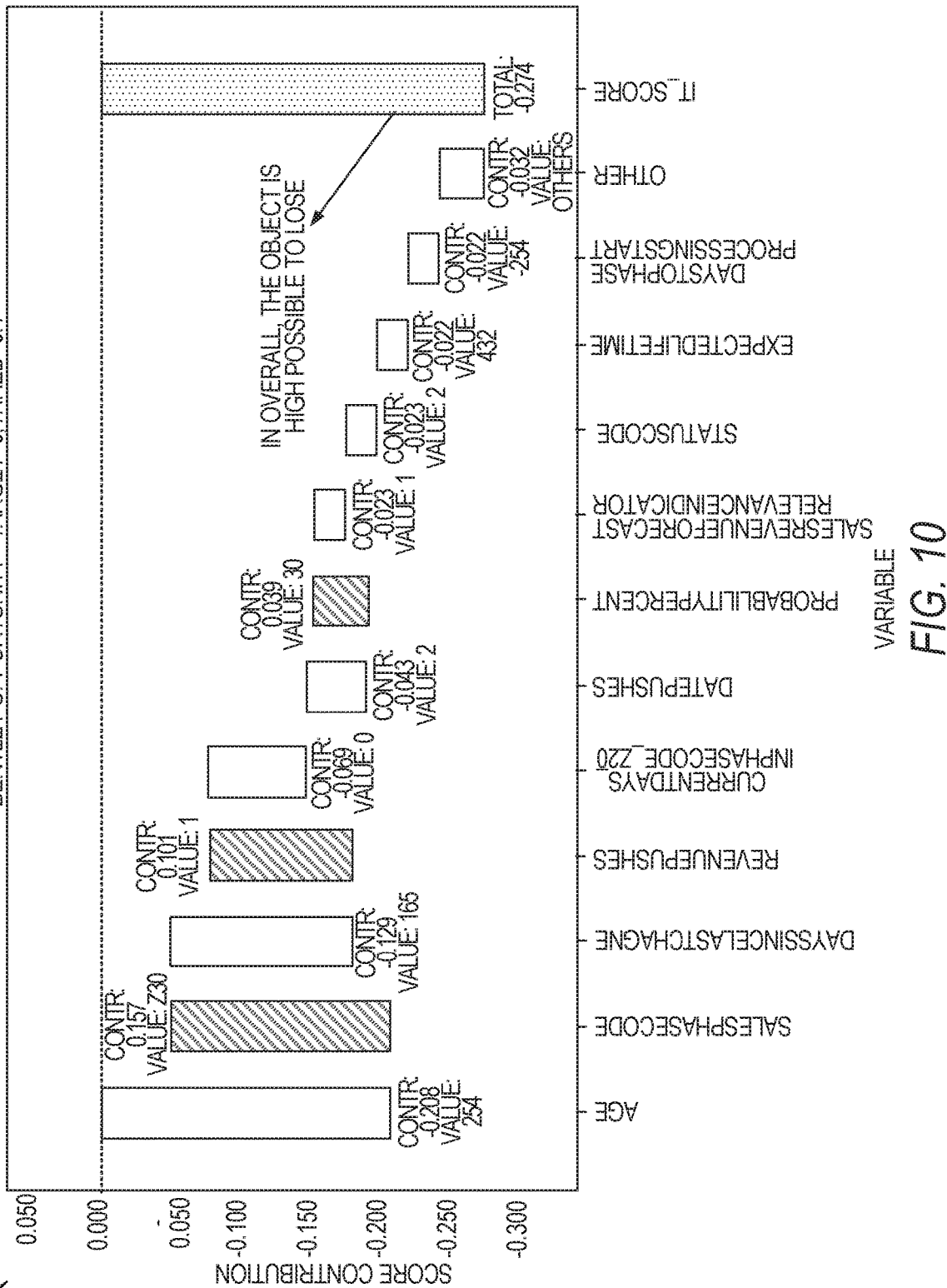
FIG. 10 is a depiction of an additional example reason code strength explanation.

FIG. 10 is a depiction of an additional example reason code strength explanation 1000. The key factors include age, sales phase code, days since last change, revenue pushes, current days in a first phase code, date pushes, probability percent, sales revenue forecast relevance indicator, status code, expected lifetime, days to phase processing start, and other. Here, the sum of the factors shows a high probability of failure.

In example embodiments, machine-learning model optimizations are implemented, including internal optimizations and external optimizations. The internal optimizations include using a hyper-parameter free model given by a structured dataset after feature engineering and data preprocessing. The external optimizations include, using a scenario configuration API, determining the best model from a plurality of models for a specific customer's data set based on model KPIs and data reality. The best model is determined through reinforcement learning, which includes iterating through all possible combinations of features in an automated action-feedback loop.

In a data readiness stage, statistical metrics are predefined to check data availability and data quality. A UI readiness check shows the overall data health to end users. An internal check optimizes scenario configuration template generation.

An explainable depiction of the artificial intelligence is provided to the end user. For example, key factors used by the AI are presented, including their impact in a determination of a winning or losing prediction. Thus, story-telling based on patterns found by machine learning is enabled.

Thus, in example embodiments, one or more of the example reason code strength explanations 900 or 1000 may be surface to a user in one or more user interfaces in conjunction with user interfaces listing one or more data items (e.g., account data items, opportunity data items, lead data items, or ticketing data items). In this way, a user may easily access relevant information pertaining to a prediction of a success or failure of a particular data item as well as adapt such information into the training of the machine-learned model (e.g., through customization of the configuration file, as discussed above).

Figure 11A:
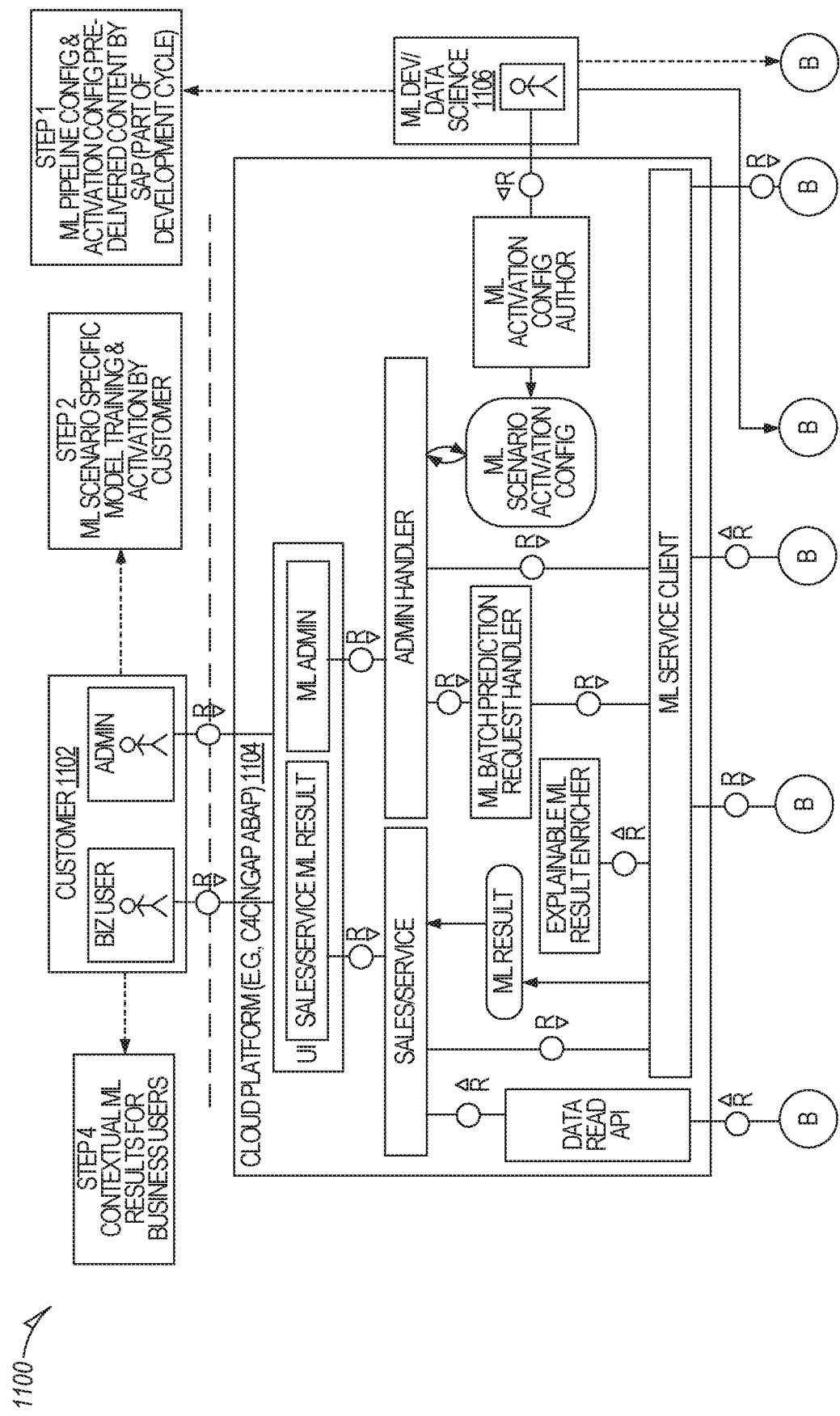
FIGS. 11A-11C are an example system architecture in which the example operations described herein are deployed.
Figure 11B:
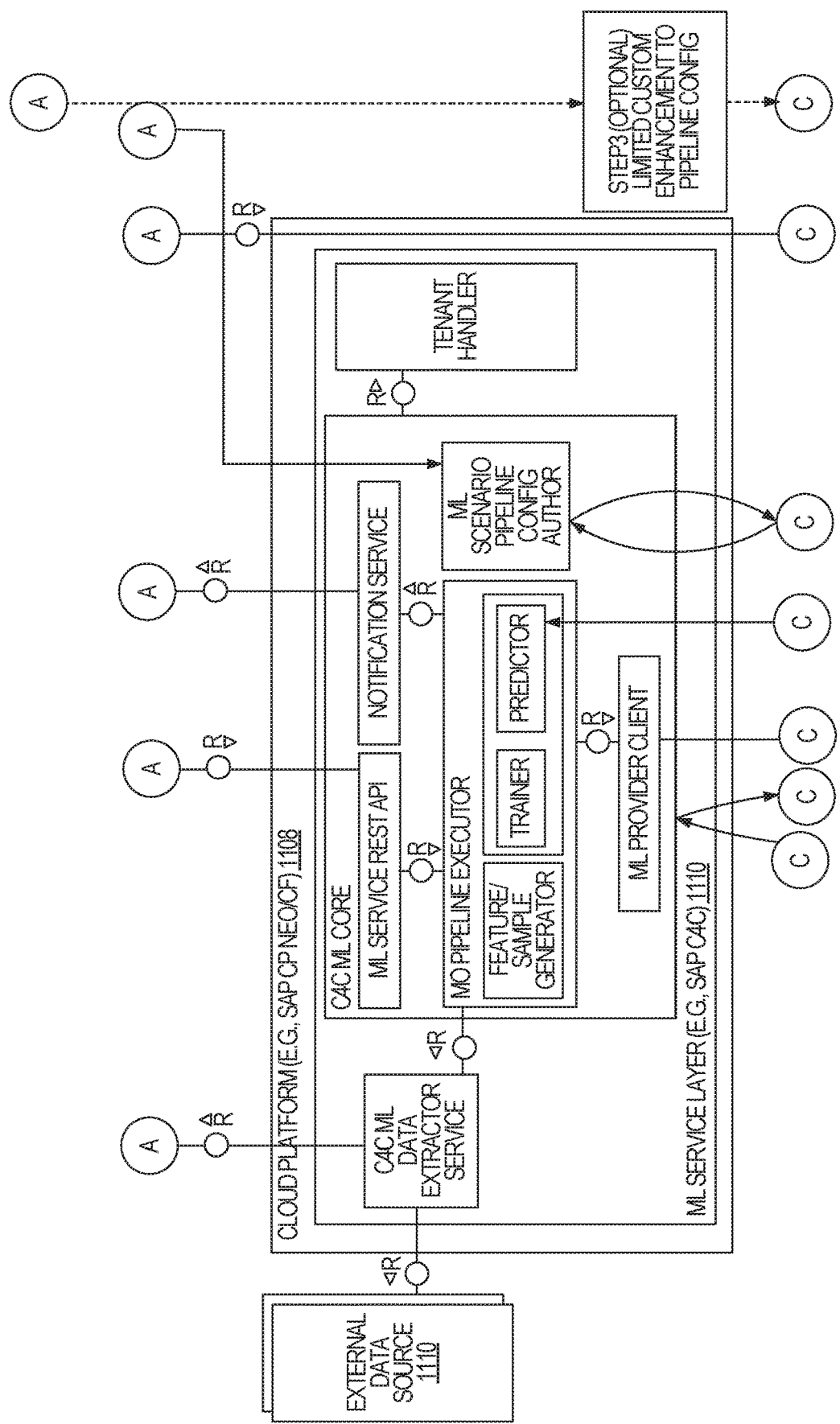
Figure 11C:
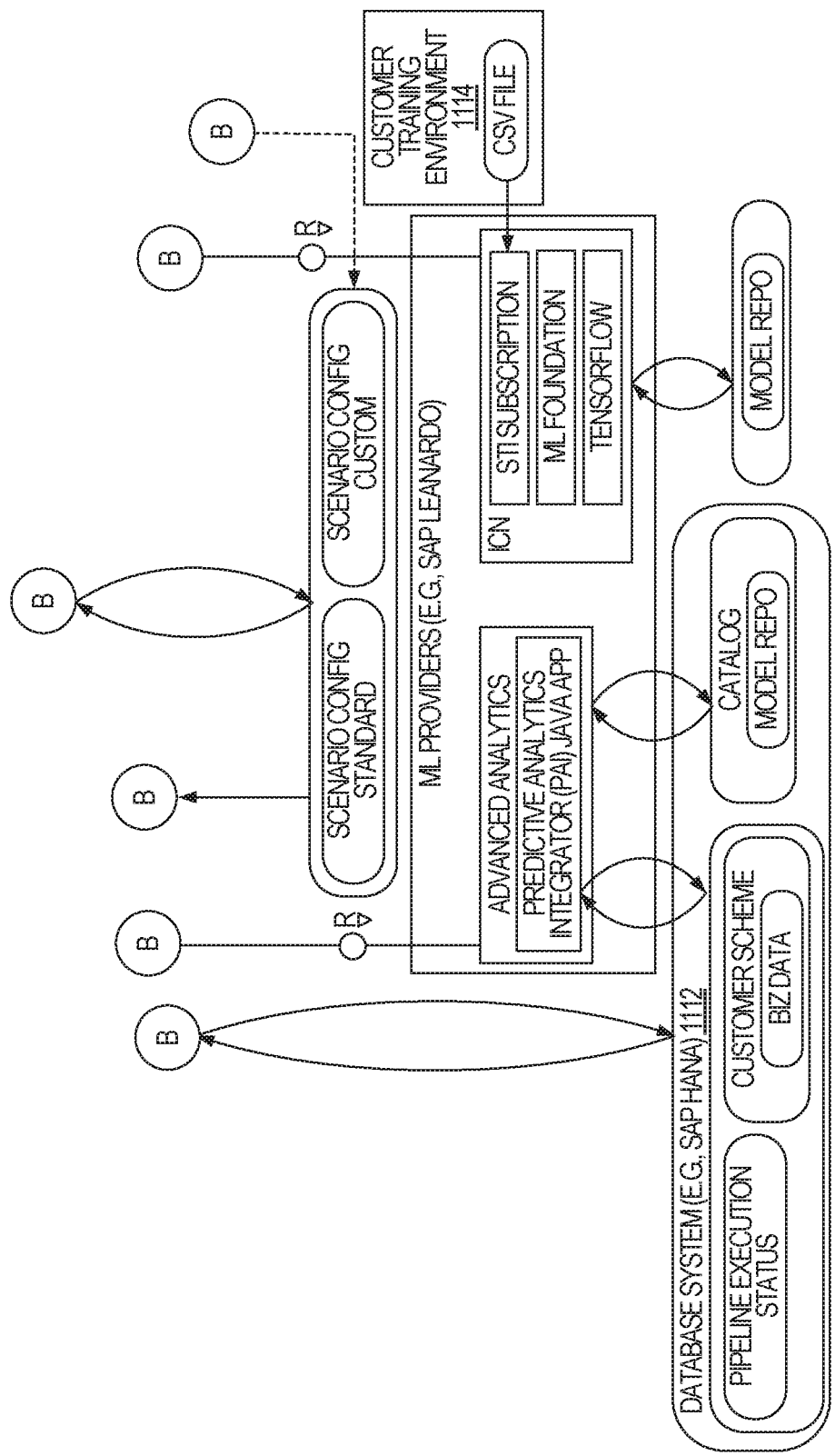

FIGS. 11A-11C are an example system architecture in which the example operations described herein (see, e.g., FIG. 5) are deployed. In example embodiments, a customer's underlying historical data is extracted to a feature template. The best-performing algorithm (e.g., machine-learned model) is automatically selected. The models are iterated over to select the best-performing feature and fine-tune parameters that will improve the model's performance. Thus, the feature engineering aspect of the machine learning is automated, reducing one of the most complex and resource-intensive exercises performed by the system, saving processor, memory, and bandwidth.

In example embodiments, scoring (e.g., of opportunities and leads) takes place via a background batch job that applies a score to all open records in near real-time. As the quality of a model is heavily dependent on quality of data, an auto-readiness report is generated based on a scan of historical records and associated quality indicators (e.g., number of updates) to indicate data readiness. In example embodiments, the machine-learning model is then made available for training, activating and deploying only if the data satisfies the readiness check, thus saving costly utilization of computing resources for model training jobs.

Customer 1102 may comprise one or more client devices on which one or more front-end user interfaces is presented, such as one or more of the user interfaces depicted in FIGS. 2-4, 8, 9, and 12-17. In example embodiments, different user interfaces are presented based on whether the customer 1102 is a business user or an administrative user. In example embodiments, the business user is presented with tools for viewing and interacting with data items based on predictions of success or failure of the data items, as discussed and shown herein. In example embodiments, the administrative user is presented with tools for adding, training, and activating machine-learned models for particular data objects, as discussed and shown herein.

In example embodiments, a cloud platform layer 1104 or other back-end services are responsive to communications received from the client or customer systems 1102. For example, the ML scenario configuration author may provide tools, including a user interface, for a data scientist or developer to author or deliver pre-defined machine-learning (ML) scenario configuration files for particular data objects. These files may thus be tailored to particular types of data objects, as discussed above, but still be general enough to be applied in multiple customer contexts.

An additional cloud platform layer 1106 may serve as the brains of the machine-learning for the particular configuration scenario (e.g., as identified and specified in the configuration file). In example embodiments, a sample generator will look into the customer specific data set and it generate domain specific features (e.g., based on the nature of each customer context) dynamically. This reduces the effort for the customers to do this work and eliminates the need for help of data scientists. For example, generating features for a lead or opportunity scoring application may depend upon the number of steps in the sales cycle of a particular customer. The number of steps in a sales cycle may be dynamic and different across different customers. In example embodiments, a pipeline executor extracts the relevant data sets by detecting their presence (e.g., with the help of data extractor component). In example embodiments, this happens before the dynamic features generation. Once feature generation is complete, a customer data specific prediction/ML model will be created (e.g., with the help of an ML trainer). Multiple models may be trained (e.g., by leveraging different underlying ML engines). Default target(s) can be set in the scenario configuration (e.g., by the data scientists/developers or dynamically/automatically during generic scenario configuration authoring time.

In example embodiments, machine-learning scenario content, such as opportunity score, lead scoring, and so on, is pre-delivered to customers for activation. Upon activation, data is automatically extracted from target tables using an auto-awareness technique. A feature engineering framework generates the necessary features automatically. These features are then passed to a back-end service (e.g., SAP PAi) for model selection and deployment. Using techniques of auto-sampling, the best performing model is picked and a probabilistic score is applied to all new records in the system (e.g., using a batch model).

In example embodiments, a database system 1112 stores various data, including configuration files and other data shown, which may be used to perform the predictive analytics described herein. The data items in data store may be accessed in conjunction with data from a customer training environment 1114 (e.g., CSV files, such as the CSV file depicted in FIG. 17) and/or data from external data sources 1110. The machine-learning providers than combine the data for training of the machine model based on the scenario configuration files. In example embodiments, the scenario configuration files include standard configuration files, such as one or more configuration files pre-defined by a data scientists for particular types of data objects and/or custom scenario configuration files (e.g., files that have been edited by an administrator via a user interface to add, modify, or remove sampling methods, targets, features, or other keys specified in the configuration file, as described above).

Figure 12:
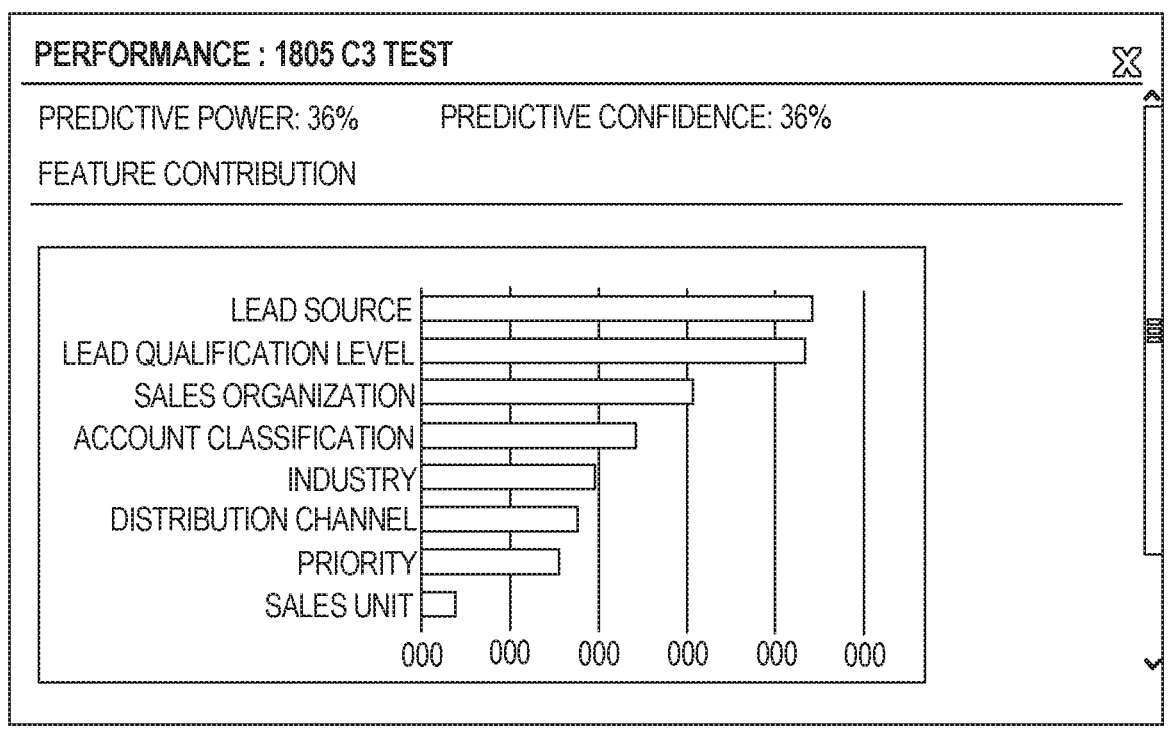
FIG. 12 is a screenshot of an example model performance user interface.

FIG. 12 is a screenshot of an example model performance user interface 1200. In example embodiments, an administrator may drill-down into model performance user interface from the management user interface of FIG. 4. The model performance user interface my show a predictive power of the model and a predictive confidence of the model, each of which may be calculated as described herein. For example, for opportunity objects, the predictive power represents how robust the predictive model is in explaining won and lost opportunities and the predictive confidence represents how well the predictive model performs with new data that has similar characteristics to the data used to create the model.

The model performance user interface may also present information pertaining to relative contributions of machine-learning features to the predictive power of the model. Here, the key features (or factors) determined from the overall training population included lead source, lead qualification level, sales organization, account classification, industry, distribution channel, priority, and sales unit.

In example embodiments, the performance user interface is only accessible when training has been completed for the model and the model is active.

Machine learning in opportunity helps to determine which deals will close, which won't, and which could go either way. Each opportunity gets a unique win Score that can be used for sales pipeline management and to focus teams on the opportunities that are most likely to close.

FIG. 13 is a screenshot of a user interface 1300 for machine-learning for opportunity objects.

When Opportunity Score is enabled for an opportunity (e.g., by an administrator), a side pane is displayed with insightful and relevant information. With opportunity score there is better prioritization of high-end propensity opportunities, better backfill and planning for at risk opportunities, sales acceleration, and predictable revenue or deal flow. In example embodiments, and administrator can personalize and move the score column to show as a second or third column and publish this for all users. In this case, the user wouldn't need to scroll to view the score column.

The opportunity score represents a calculation of the probability of success for each sales opportunity in the sales pipeline based on the model. In other words, in example embodiments, opportunity scoring uses a machine-learning model trained on past sales date to predict the probability of a deal. In example embodiments, the side pane display is not available for opportunities that are not yet scored, reflects the data based on state before the opportunity was closed, and is updated periodically (e.g., daily) with the opportunity score.

In example embodiments, the opportunity score has a number range from 0-99. A high score means a higher chance of the opportunity being won. Sales representatives may use these scores to prioritize the opportunities they work on. They may drill-down into the user interface, using interactive user interface elements, to see the opportunity score and details about the key factors that contributed to a score. Here, the score may be categorized into ranges, such as, for example, 75-99 (very likely with number displayed in green), 51-74 (likely with number displayed in yellow), 0-50 (less likely with number displayed in red).

The factors represented in the side pane for the opportunity score may include, for example, any of the following:

Key factors. Indicates the top attributes that influence the score.

Activity Engagement. Shows the level of activities across channels, such as email, phone call, and calendar.

Days to Close is X/Days Past Due Date is X. Shows the difference between the close date and current date and shows the number of days left before the close date. After expiry of this time, you will see the key factor change to Days Past Due Date as the factor.

Time to Closing Date Pushed is X. Shows a count of the number of updates made to the Close Date field. You see the average number of times close date has been updated for all historical won opportunities and how that specific opportunity compares to the average.

Days in an Opportunity Status is X. Shows a count of the number of days that opportunity has been a part of a given stage. And, how it compares to average of all other deals.

Amount Changed. Shows most recent change to the deal amount-whether it increased or decreased.

Times Deal Slipped. Shows how many times the deal moved from one quarter pipeline to another.

Figure 14:
FIG. 14 is a screenshot of a user interface for machine-learning for lead objects.

FIG. 14 is a screenshot of a user interface 1400 for machine-learning for lead objects.

Lead scoring may be used to focus on leads with the highest propensity of becoming customers. In this way, an organization may be built from the top of the funnel by searching external data sources to create a tailored list of prospects.

When Lead Score is enabled for a lead (e.g., by an administrator, a side pane is displayed with insightful and relevant information. Lead scoring is a ranking technique. A higher lead score means a higher the chance of the lead getting converted to an opportunity.

With the lead score, there is better prioritization of high-end propensity leads to be converted into an opportunity. The user interface can help sales and marketing teams predict and prioritize leads that are likely to get converted into successful opportunities compared to those that are unlikely to get converted.

You can calculate the probability of success for each sales lead in the sales pipeline with the lead score. Lead Scoring uses the machine learning model trained on past sales data to predict the probability of a deal. Lead scoring prioritizes leads based on the propensity to win.

The Lead Score returned from machine learning has a number range from 0-99 and may categorized, for example, as 75-99 (Very Likely with number displayed in green)

51-74 (Likely with number displayed in yellow)

0-50 (Less Likely with number displayed in red)

A higher lead score means a higher chance of getting converted into an opportunity.

In example embodiments. Lead Type shows the categorization into lead buckets-A, B, C.

Type A: lead score range is 75-99

Type B: Lead score range is 51-74

Type C: Lead score range is 0-50

The user interface may show any of the following:

Key factors. Indicates the top attributes that influences the lead score.

Activity Engagement. Shows level of activities across channels-email, phone call and calendar.

X Days in X status. Is the number of days a lead stays in a particular qualification level (such as cold, warm, hot).

Status. Shows most recent change to lead status. The status can be upgraded or downgraded. Upgraded means the lead goes from created to open or open to qualified. Downgraded means the lead was rejected by sales and sent back for nurture.

Figure 15:
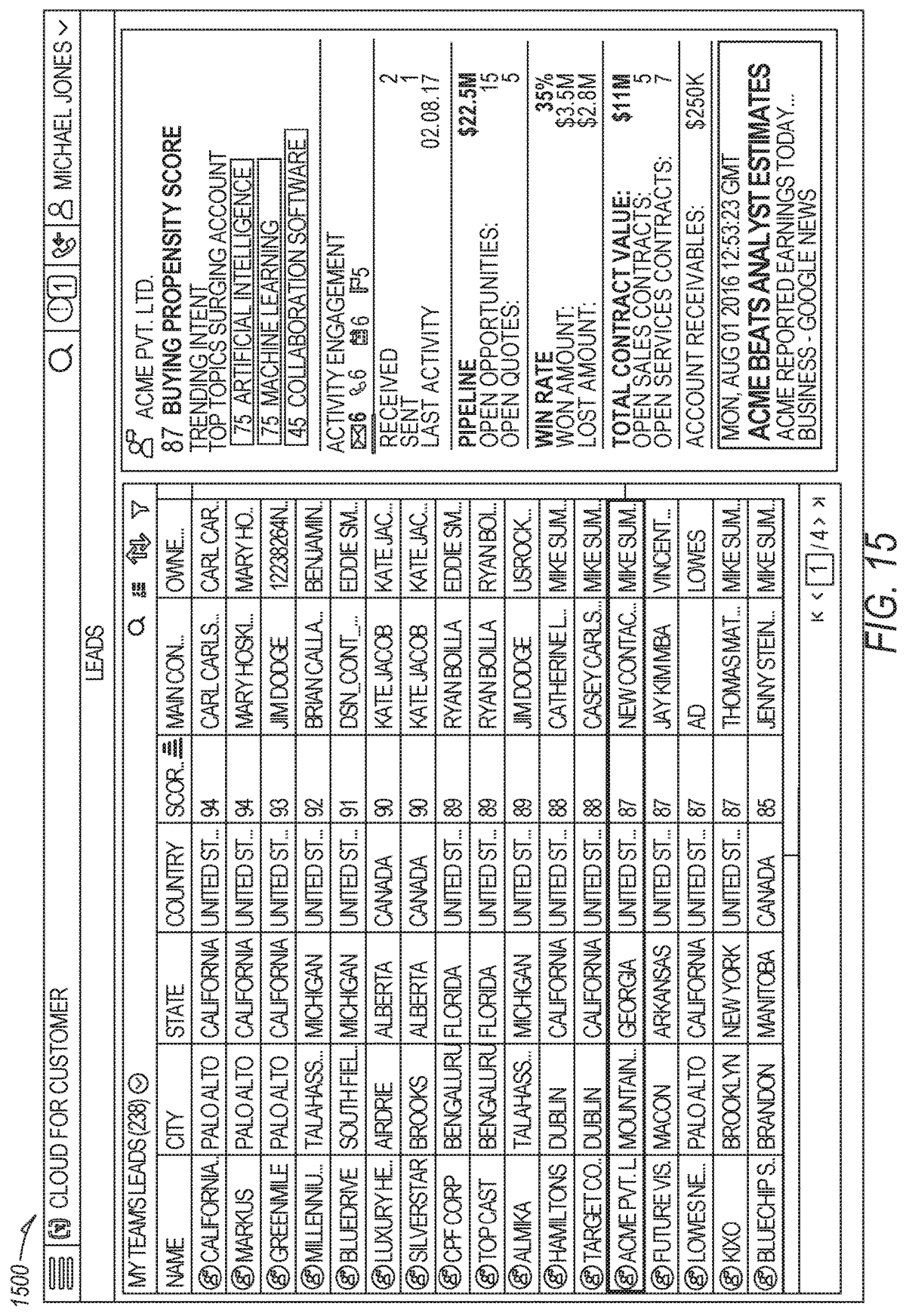

FIG. 15 is a screenshot of a user interface 1500 for machine-learning for account objects.

Machine learning in accounts provides sales reps with a 360 view of accounts and visibility across department's activity with the account. They receive a health check for the account and know the next steps to take in the sales process.

When Account Intelligence is enabled for an account (e.g., by an administrator), a side pane is displayed with insightful and relevant information. Account intelligence helps target B2B accounts with highest propensity to buy or close while maximizing the lifetime value.

With account intelligence, you can have better account-based targeting that is consistent with account planning. There is 360-degree view of account both from internal and external data sources and improved customer lifetime value and satisfaction. Thus, account insights can be used to drive account-based selling.

You are able to see the buying propensity score (likelihood the customer may buy) and the topics that are trending that you have been viewing or are interested in. The buying propensity score is an aggregate score for an account. Buying intent signals are captured across the business to business (B2B) web for the accounts. When an account is experiencing a significant increase in content or topic consumption it is considered to be experiencing a "Surge." Surge score ranges from 1-99 and are updated periodically (e.g., in a batch mode weekly).

Comprehensive taxonomy of topics across industries are available to configure in Administration Settings. SAP Hybris Cloud for Customer displays the overall surge score coupled with top 3 Trending topics that are driving the score at account level.

A higher activity engagement score means higher email and calendar activity for that account.

Example color-coding ranges include, for example:
0-50=Red=Low engagement
51-74=Yellow=Medium engagement
75-99=Green=High engagement Any of the following information may be displayed in the side pane for an account:

Activity engagement. It captures summary of emails, phone calls, calendar, appointments and follow-ups as available in the solution for last 1 year.

Pipeline. Total Value of Pipeline at account. Open Opportunities: Total number of open opportunities. Open Quotes: Total number of open quotes.

Win Rate. Historical average win rate for opportunities by count in the last 1 year. Won Amount: Show historical won or booked amount for that account. Lost Amount: Show historical lost amount for that account.

Total Contract Value. Total Amount contracted with account. Open Sales Contract. Total number of sales contracts that are open. Open Service Contract: Total number of service contracts that are open.

Accounts Receivable. Total accounts receivable for that account.

Figure 16:
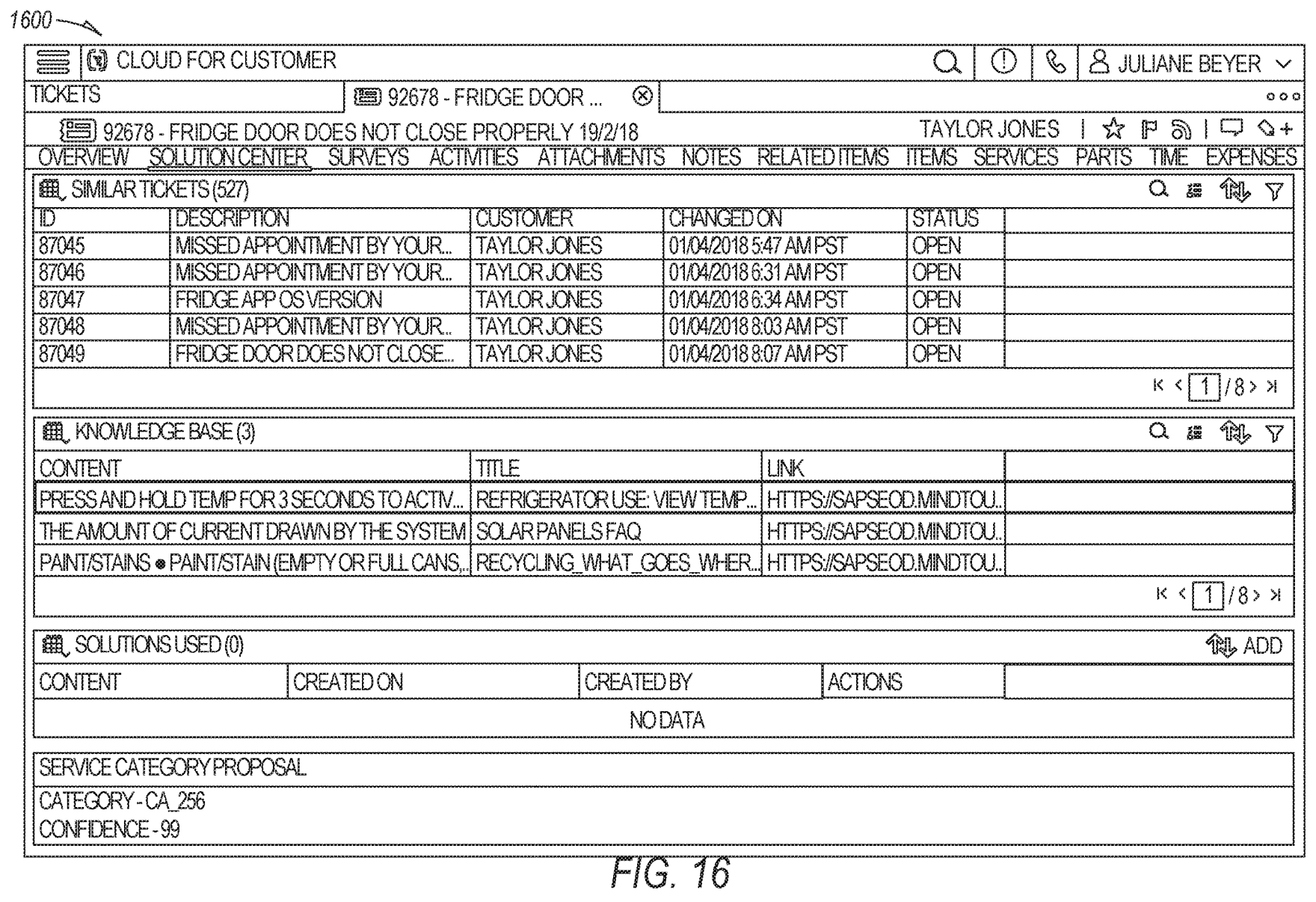

An account Activity engagement score may be in a range from a range of 1-100. Higher activity engagement score means higher email and calendar activity for that account. The range is High engagement, Medium Engagement, Low engagement. The score may be a read-only field with option to share feedback (thumbs up or thumbs down). Account Activity information such as email, phone call, calendar/appointment, attachment and follow-up may be the same as in opportunity scoring. Color coding for score may be, for example,
0-50=Red=Low engagement
51-75=Yellow=Medium engagement
75-99=Green=High engagement FIG. 16 is a screenshot of a user interface for machine-learning for ticketing objects.

In example embodiments, service ticket learning proposes ticket categories based on modeling historical ticket data.

When a customer sends a message via email, social platforms, or any other platform into the solution, the content of the message is analyzed using the trained model, and the service category is identified. Additional categories that may be supported for machine learning include Incident Category and Cause Category.

Ticket categorization increases agent productivity, there is better prioritization of incoming tickets and automatic classification based on model accuracy.

FIG. 17 is a listing of an example training data set 1600 for a model for service ticket objects. In example embodiments, the training data should include a predetermined or configurable minimum of samples (e.g., 20) for every unique label (e.g., category, complain, request, compliment, and so on). Additionally, there may be a recommended number of records (e.g., 1000) for every unique label. The minimum and recommended values may be selected to reduce or eliminate the changes of a failure during training. This training set may then be accessed by the back-end services for generation of the machine-learned model (e.g., as depicted and described with respect to FIGS. 11A-11C).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 102) and via one or more appropriate interfaces (e.g., APIs).

Example embodiments may be implemented in digital electronic circuitry, or in computer hardware, firmware, or software, or in combinations of them. Example embodiments may be implemented using a computer program product (e.g., a computer program tangibly embodied in an information carrier, in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 18:
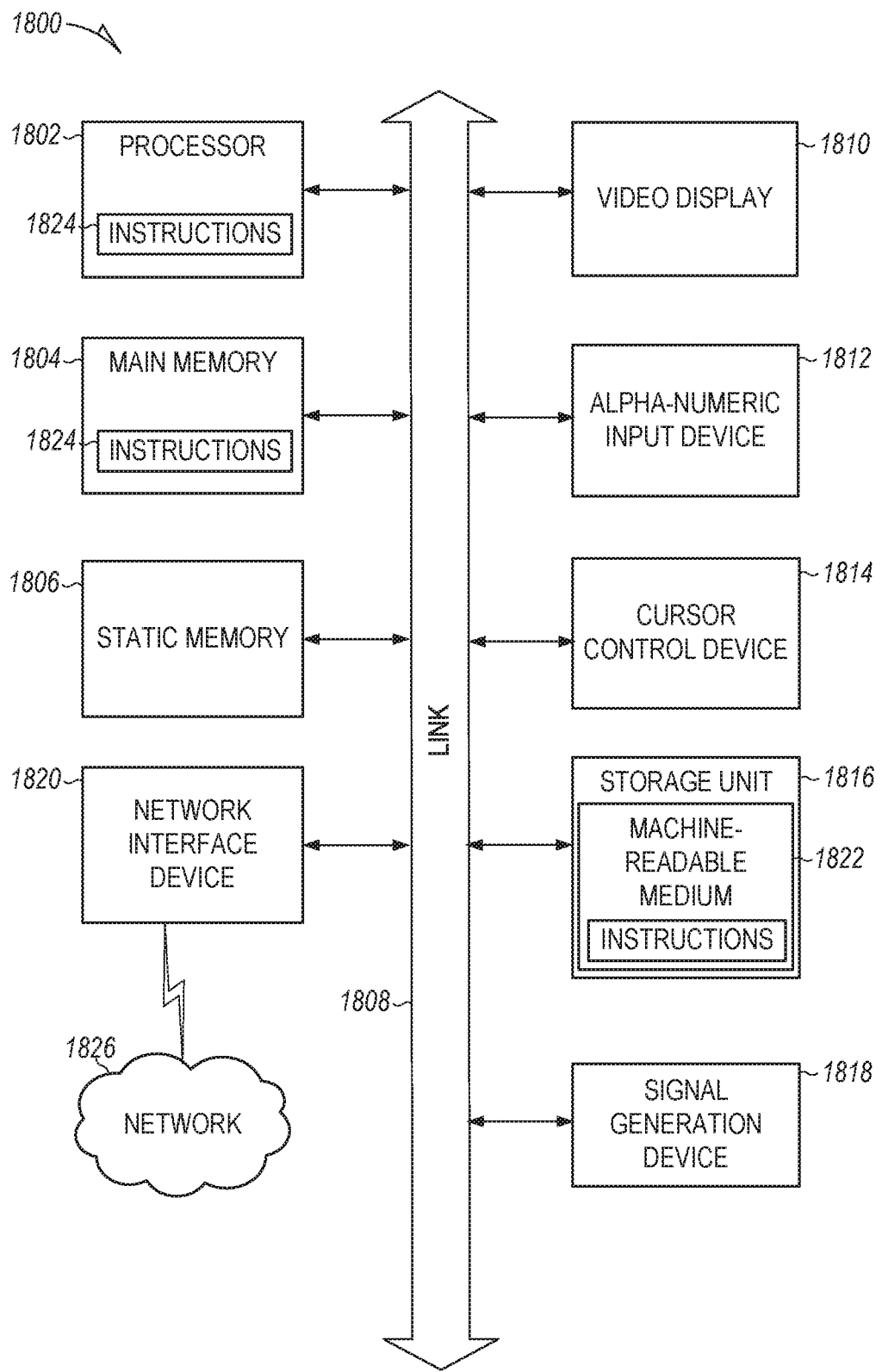
FIG. 18 is a block diagram of a machine in the example form of a computer system within which instructions for causing the machine to perform any one or more of the operations or methodologies discussed herein may be executed.

FIG. 18 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile phone (e.g., an iPhone or a mobile phone executing an Android operating system), a web appliance, a network router, a network switch or a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU), or both), a main memory 1804, and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816 (e.g., a disk drive unit), a signal generation device 1818 (e.g., a speaker), and a network interface device 1820.

The storage unit 1816 includes a machine-readable medium 1822 on which is stored one or more sets of instructions and data structures (e.g., software) 1824 embodying or utilized by any one or more of the methodologies or functions described herein. The instructions 1824 may also reside, completely or at least partially, within the main memory 1804 or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., hypertext transfer protocol (HTTP)). Examples of communication networks include LANs, WANs, the Internet, mobile telephone networks, plain old telephone service (POTS) networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 102.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of example embodiments. Combinations of the above embodiments, and other embodiments not specifically described herein, will be apparent to those of skill in the art upon reviewing the above description.

What is claimed is:

1. A system comprising:
   one or more computer processors;
   one or more computer memories;
   a set of instructions incorporated into the one or more computer memories, the set of instructions configuring the one or more computer processors to perform operations for improving usability and transparency of machine-learning aspects of an application scoring of underlying data items, the operations comprising:
   based on a request submitted through an administrative user interface to add a machine-learned model to a data object associated with the application for the scoring of the underlying data items, performing a data readiness check on the underlying data items using historical data related to the underlying data items to determine whether the underlying data is of sufficient quality from which to generate one or more machine learning models, the historical data being data about how the underlying data items were used over a time period;
   based on a successful completion of the data readiness check, retrieving a configuration file from an application server, the configuration file specifying a plurality of keys, the plurality of keys including a plurality of different sampling methods and corresponding target values, each sampling method being a different process by which data within training data is selected for use in training a machine-learned model, and each sampling method having a corresponding target identifying a goal of the sample method;
   generating a plurality of machine-learned models by applying different combinations of the sampling methods and corresponding target values to training data;
   performing a dry run on each of the plurality of models using the historical data;

selecting a first machine-learned model from a plurality of machine-learned models based on results of the dry runs; and activating the first machine-learned model with respect to the application, the activating including generating scores for the underlying data items based on the first machine-learned model.

2. The system of claim 1, the operations further comprising presenting a visual representation of the configuration file in an interactive user interface, the interactive user interface allowing an administrator to modify the configuration file to add or remove sampling methods, feature templates, or data sources.

3. The system of claim 1, wherein the activating of the first machine-learned model is based on a request received through the administrative user interface to activate the first machine-learned model.

4. The system of claim 1, wherein the data readiness check includes verifying that the data passes configurable minimum levels of quality and quantity.

5. The system of claim 1, wherein the operations further including generating strengths of each of a plurality of features corresponding to the scores with respect to its predictive impact.

6. The system of claim 1, the operations further including modifying one or more other configuration files of a plurality of configuration files based on a measure of predictive success of the machine-learned model.

7. The system of claim 1, wherein the configuration file is selected from a plurality of pre-defined configuration files corresponding based on a matching of the underlying data to types of data for which the pre-defined configuration files were optimized.

8. A method comprising:

based on a request submitted through an administrative user interface to add a machine-learned model to a data object associated with an application for scoring of underlying data items, performing a data readiness check on the underlying data items using historical data related to the underlying data items to determine whether the underlying data is of sufficient quality from which to generate one or more machine learning models, the historical data being data about how the underlying data items were used over a time period;

based on a successful completion of the data readiness check, retrieving a configuration file from an application server, the configuration file specifying a plurality of keys, the plurality of keys including a plurality of different sampling methods and corresponding target values, each sampling method being a different process by which data within training data is selected for use in training a machine-learned model, and each sampling method having a corresponding target identifying a goal of the sample method;

generating a plurality of machine-learned models by applying different combinations of the sampling methods and corresponding target values to training data;

performing a dry run on each of the plurality of models using the historical data;

selecting a first machine-learned model from a plurality of machine-learned models based on results of the dry runs; and activating the first machine-learned model with respect to the application, the activating including generating scores for the underlying data items based on the first machine-learned model.

9. The method of claim 8, further comprising presenting a visual representation of the configuration file in an interactive user interface, the interactive user interface allowing an administrator to modify the configuration file to add or remove sampling methods, feature templates, or data sources.

10. The method of claim 8, wherein the activating of the first machine-learned model is based on a request received through the administrative user interface to activate the first machine-learned model.

11. The method of claim 8, wherein the data readiness check includes verifying that the data passes configurable minimum levels of quality and quantity.

12. The method of claim 8, further comprising generating strengths of each of a plurality of features corresponding to the scores with respect to its predictive impact.

13. The method of claim 8, further comprising modifying one or more other configuration files of a plurality of configuration files based on a measure of predictive success of the machine-learned model.

14. The method of claim 8, wherein the configuration file is selected from a plurality of pre-defined configuration files corresponding based on a matching of the underlying data to types of data for which the pre-defined configuration files were optimized.

15. A non-transitory machine-readable medium storing a plurality of instructions that, when implemented by one or more computer processors, cause the one or more computer processors to perform operations for improving usability and transparency of machine-learning aspects of an application for scoring of underlying data items, the operations comprising:

based on a request submitted through an administrative user interface to add a machine-learned model to a data object associated with the application for the scoring of the underlying data items, performing a data readiness check on the underlying data items using historical data related to the underlying data items to determine whether the underlying data is of sufficient quality from which to generate one or more machine learning models, the historical data being data about how the underlying data items were used over a time period;

based on a successful completion of the data readiness check, retrieving a configuration file from an application server, the configuration file specifying a plurality of keys, the plurality of keys including a plurality of different sampling methods and corresponding target values, each sampling method being a different process by which data within training data is selected for use in training a machine-learned model, and each sampling method having a corresponding target identifying a goal of the sample method;

generating a plurality of machine-learned models by applying different combinations of the sampling methods and corresponding target values to training data;

performing a dry run on each of the plurality of models using the historical data;

selecting a first machine-learned model from a plurality of machine-learned models based on results of the dry runs; and activating the first machine-learned model with respect to the application, the activating including generating scores for the underlying data items based on the first machine-learned model.

16. The machine-readable medium of claim 15, the operations further comprising presenting a visual representation of the configuration file in an interactive user interface, the interactive user interface allowing an administrator to modify the configuration file to add or remove sampling methods, feature templates, or data sources.

17. The machine-readable medium of claim 15, wherein the activating of the first machine-learned model is based on a request received through the administrative user interface to activate the first machine-learned model.

18. The machine-readable medium of claim 15, wherein the data readiness check includes verifying that the data passes configurable minimum levels of quality and quantity.

19. The machine-readable medium of claim 15, the operations further including generating strengths of each of a plurality of features corresponding to the scores with respect to its predictive impact.

20. The machine-readable medium of claim 15, the operations further including modifying one or more other configuration files of a plurality of configuration files based on a measure of predictive success of the machine-learned model.

21. The system of claim 1, wherein the plurality of keys further include one or more feature templates.

22. The system of claim 21, wherein the one or more feature templates include a history table.

23. The system of claim 21, wherein the one or more feature templates include one or more activity features.

24. The system of claim 21, wherein the one or more feature templates include one or more product features.

\* \* \* \* \*